(12) United States Patent
Saha et al.

(10) Patent No.: US 10,012,388 B2
(45) Date of Patent: Jul. 3, 2018

(54) FUEL SUPPLY SYSTEM FOR TURBINE ENGINES AND METHODS OF ASSEMBLING SAME

(71) Applicant: GENERAL ELECTRIC COMPANY, Schenectady, NY (US)

(72) Inventors: Rajarshi Saha, Karnataka (IN); Sudhakar Todeti, Karnataka (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/333,964

(22) Filed: Oct. 25, 2016

(65) Prior Publication Data

US 2018/0112880 A1    Apr. 26, 2018

(51) Int. Cl.
| | | |
|---|---|---|
| F23R 3/30 | (2006.01) | |
| F02C 7/22 | (2006.01) | |
| F23R 3/36 | (2006.01) | |
| F02C 3/30 | (2006.01) | |

(52) U.S. Cl.
CPC ............... F23R 3/30 (2013.01); F02C 7/222 (2013.01); *F02C 3/305* (2013.01); *F05D 2260/212* (2013.01); *F23R 3/36* (2013.01)

(58) Field of Classification Search
CPC ........ F05D 2220/75; F02C 3/30; F02C 3/305; F23R 3/36
See application file for complete search history.

(56) References Cited

U.S. PATENT DOCUMENTS

| | | | |
|---|---|---|---|
| 4,160,526 A | | 7/1979 | Flanagan |
| 4,813,867 A | * | 3/1989 | Yoshida ................. F23C 6/045 126/91 A |
| 4,949,538 A | * | 8/1990 | Iasillo .................... F02C 7/228 60/39.465 |
| 5,071,068 A | * | 12/1991 | Suniewski ........... B01F 5/0057 239/403 |
| 5,784,875 A | | 7/1998 | Statler |
| 6,598,801 B1 | | 7/2003 | Fortuna et al. |
| 2005/0193741 A1 | * | 9/2005 | Iasillo ...................... F02C 3/22 60/776 |
| 2006/0165898 A1 | * | 7/2006 | Kodas ..................... B01J 23/42 427/258 |

(Continued)

FOREIGN PATENT DOCUMENTS

CA      1179155 A1   12/1984

*Primary Examiner* — Gerald L Sung
*Assistant Examiner* — Stephanie Cheng
(74) *Attorney, Agent, or Firm* — Armstrong Teasdale LLP

(57) ABSTRACT

A fuel supply system includes a first fuel supply line coupled in flow communication with a first fuel nozzle and configured to channel a first fuel flow to the first nozzle. A second fuel supply line coupled in flow communication with a second fuel nozzle and configured to channel a second fuel flow to the second nozzle. A water supply line coupled in flow communication with a water injection nozzle and configured to channel a water flow to the water injection nozzle. An atomizing fluid supply circuit coupled in flow communication with the first and second fuel supply lines. The atomizing fluid supply circuit configured to channel an atomizing fluid flow to an atomizing nozzle and into atomizing contact with the water flow. The atomizing fluid includes a portion of at least one of the first fuel flow and the second fuel flow.

17 Claims, 4 Drawing Sheets

(56) References Cited

U.S. PATENT DOCUMENTS

| | | | |
|---|---|---|---|
| 2010/0146984 A1 | 6/2010 | Carroni et al. | |
| 2012/0129111 A1* | 5/2012 | Robertson | F23C 1/08 |
| | | | 431/9 |
| 2013/0097991 A1* | 4/2013 | Zhang | F23K 5/06 |
| | | | 60/39.59 |
| 2015/0059352 A1* | 3/2015 | Myers | F02C 9/40 |
| | | | 60/776 |
| 2017/0204785 A1* | 7/2017 | Ramier | F02C 3/30 |
| 2017/0234542 A1* | 8/2017 | Barve | F23R 3/36 |
| | | | 60/746 |

* cited by examiner

FUEL SUPPLY SYSTEM FOR TURBINE ENGINES AND METHODS OF ASSEMBLING SAME

BACKGROUND

The present disclosure relates generally to fuel supply systems and, more specifically, to systems and methods for water atomization in combustor assemblies using combustion turbine engine fuel.

At least some known combustion turbine engines include a compressor, at least one combustor, and a turbine coupled together in a serial flow relationship. More specifically, the compressor and turbine are coupled through a shaft to form a high-pressure rotor assembly. Air entering the turbine engine is mixed with a fuel flow from a fuel supply system and prior to it being ignited in a combustion chamber to form a high energy gas stream. The high energy gas stream flows through the turbine to rotatably drive the turbine such that the shaft rotatably drives the compressor.

The combustion turbine engine may operate with any of several types of fuels including, for example, liquid fuels or gaseous fuels that are supplied to the combustion chamber from the fuel supply system. During combustion of at least some known liquid fuels, the liquid fuel flow is atomized with a stream of high-pressure air supplied by an atomizing air compressor. Additionally, water may also be injected in the combustion chamber, along with liquid fuel flow to facilitate reducing nitrogen oxide (NOx) emissions. Typically, water injected into the combustion chamber is also atomized with a stream of high-pressure air supplied by the atomizing air compressor. During combustion of at least some known gaseous fuels, the gaseous fuel flow does not need to be atomized, and thus the atomizing air compressor is not required. However, injecting atomized water into the combustion chamber with the gaseous fuel flow may facilitate reducing NOx emissions. However, for at least some turbine engines that operate with only gaseous fuel, adding a separate atomizing air compressor increases the overall cost of the combustion turbine engine.

BRIEF DESCRIPTION

In one aspect, a fuel supply system is provided. The fuel supply system includes a first fuel supply line coupled in flow communication with at least one first fuel nozzle and configured to channel a flow of a first fuel to the at least one first fuel nozzle. A second fuel supply line coupled in flow communication with at least one second fuel nozzle and configured to channel a flow of a second fuel to the at least one second fuel nozzle. A water supply line coupled in flow communication with at least one water injection nozzle and configured to channel a flow of water to the at least one water injection nozzle. The fuel supply system further includes an atomizing fluid supply circuit coupled in flow communication with the first and second fuel supply lines. The atomizing fluid supply circuit configured to channel a flow of an atomizing fluid to at least one atomizing nozzle and into atomizing contact with the water flow. The atomizing fluid includes at least a portion of at least one of the first fuel flow and the second fuel flow.

In a further aspect, a turbine assembly is provided. The combustion turbine assembly includes a combustor and a fuel supply system configured to supply a flow of fuel to the combustor. The fuel supply system includes a first fuel supply line coupled in flow communication with at least one first fuel nozzle and configured to channel a flow of a first fuel to the at least one first fuel nozzle. A second fuel supply line coupled in flow communication with at least one second fuel nozzle and configured to channel a flow of a second fuel to the at least one second fuel nozzle. A water supply line coupled in flow communication with at least one water injection nozzle and configured to channel a flow of water to the at least one water injection nozzle. The fuel supply system further includes an atomizing fluid supply circuit coupled in flow communication with the first and second fuel supply lines. The atomizing fluid supply circuit configured to channel a flow of an atomizing fluid to at least one atomizing nozzle and into atomizing contact with the water flow. The atomizing fluid includes at least a portion of at least one of the first fuel flow and the second fuel flow.

In another aspect, a method of assembling a fuel supply system for use in a turbine assembly is provided. The method includes coupling a first fuel supply line in flow communication with at least one first fuel nozzle, the first fuel supply line is configured to channel a flow of a first fuel to the at least one first fuel nozzle. Coupling a second fuel supply line in flow communication with at least one second fuel nozzle, the second fuel supply line is configured to channel a flow of a second fuel to the at least one second fuel nozzle. Coupling a water supply line in flow communication with at least one water injection nozzle, the water supply line is configured to channel a flow of water to the at least one water injection nozzle. The method further includes coupling an atomizing fluid supply circuit in flow communication with the first and second fuel supply lines. The atomizing fluid supply circuit is configured to channel a flow of an atomizing fluid to at least one atomizing nozzle and into atomizing contact with the water flow. The atomizing fluid includes at least a portion of at least one of the first fuel flow and the second fuel flow.

DETAILED DESCRIPTION OF THE INVENTION

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Approximating language may be applied to modify any quantitative representation that could permissibly vary without resulting in a change in the basic function to which it is related. Accordingly, a value modified by a term or terms, such as "about," "approximately," and "substantially," is not to be limited to the precise value specified. In at least some instances, the approximating language may correspond to the precision of an instrument for measuring the value. Here and throughout the specification and claims, range limitations may be identified. Such ranges may be combined and/or interchanged, and include all the subranges contained therein unless context or language indicates otherwise.

Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Embodiments of the present disclosure relate to systems and methods for atomizing water with a fuel flow during water injection within a combustion turbine engine. In the exemplary embodiment, the fuel supply system selectively channels a flow of fuel from at least one fuel source, for example, natural gas or synthetic gas, to a nozzle assembly positioned in a combustor assembly. The fuel flow is mixed with compressed air to generate combustion gases within a combustion chamber. In some embodiments, a portion of the fuel flow is also mixed with water injected into the combustion chamber to facilitate reducing combustion emissions. Additionally, in operating scenarios in which water is not injected into the combustion chamber, the fuel flow may also be used as purge fluid for the water supply conduit to reduce any backflow of combustion gases. By atomizing the water injected into the combustion chamber with a portion of the fuel flow used for combustion, additional atomizing fluid sources, such as an atomizing air compressor, are eliminated from the combustion turbine engine, thus reducing equipment and maintenance costs.

Figure 1:
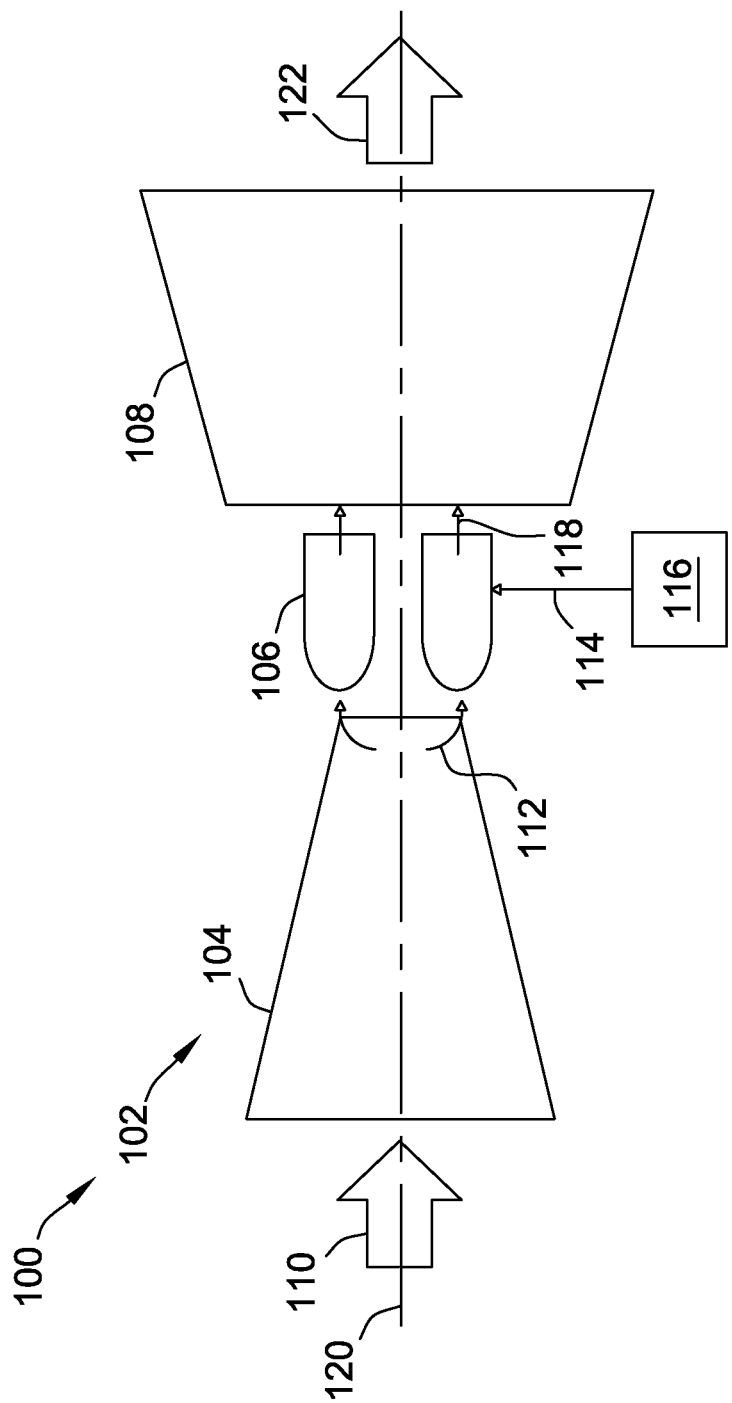
FIG. 1 is a schematic illustration of an exemplary turbine assembly.

FIG. 1 is a schematic illustration of an exemplary combustion turbine assembly 100. In the exemplary embodiment, combustion turbine assembly 100 includes a turbine engine 102 that includes a compressor 104, and a combustor assembly 106 downstream from compressor 104. Turbine engine 102 also includes a turbine 108 downstream from combustor assembly 106.

In operation, a flow of intake air 110 is channeled through compressor 104 and a flow of compressed air 112 is discharged from compressor 104 and channeled towards combustor assembly 106. At combustor assembly 106, compressed air 112 is mixed with a fuel flow 114, channeled from a fuel supply system 116, and the mixture is combusted to form a flow of combustion gases 118 that are discharged towards turbine 108. Combustion gases 118 are channeled through turbine 108 to convert thermal energy to mechanical rotational energy used to drive turbine 108 about a centerline 120 of combustion turbine engine 102. Combustion gases 118 are then discharged from combustion turbine engine 102 in the form of a flow of exhaust gases 122.

Figure 2:
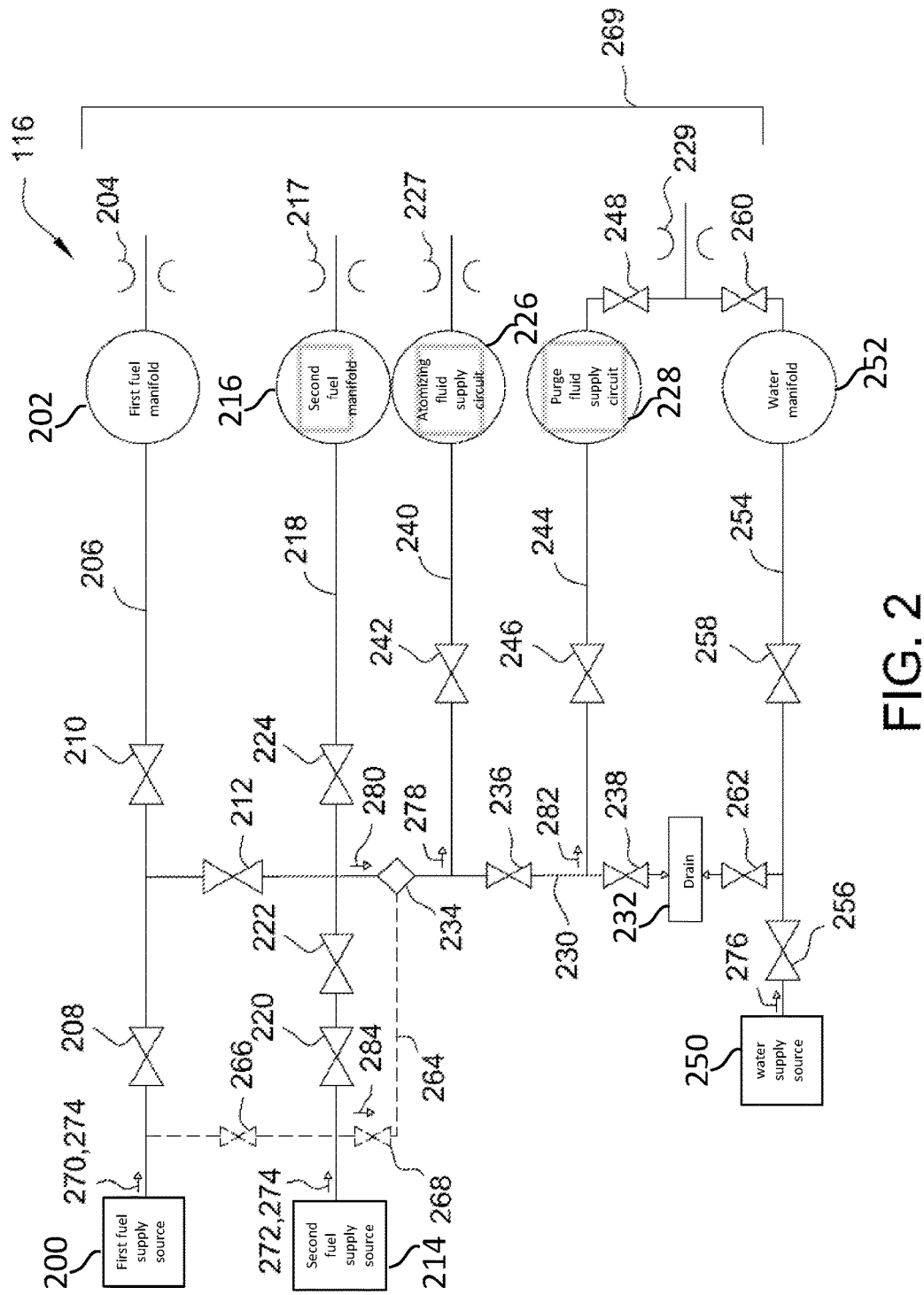
FIG. 2 is a schematic illustration of an exemplary fuel supply system that may be used with the turbine assembly shown in FIG. 1.

FIG. 2 is a schematic illustration of an exemplary fuel supply system 116 that may be used with turbine assembly 100 (shown in FIG. 1). In the exemplary embodiment, fuel supply system 116 includes a first fuel supply source 200 coupled in flow communication to a first fuel manifold 202 and to at least one first fuel nozzle 204 of combustor assembly 106 (shown in FIG. 1) via a first fuel supply line 206. First fuel supply line 206 includes a plurality of operational valves coupled in flow communication along first fuel supply line 206, such as, for example, a stop/speed ratio valve 208 and a first control valve 210. A second control valve 212 is coupled in flow communication between first fuel supply line 206 and a tap-off line 230. Fuel supply system 116 also includes a second fuel supply source 214 coupled in flow communication to a second fuel manifold 216 and at least one second fuel nozzle 217 via a second fuel supply line 218. Second fuel supply line 218 includes a plurality of operational valves coupled in flow communication along second fuel supply line 218, such as, for example, a stop/speed ratio valve 220, a first control valve 222, and a second control valve 224.

Each fuel supply source 200 and 214 is coupled in flow communication with an atomizing fluid supply circuit 226 and a purge fluid supply circuit 228 via tap-off line 230. Tap-off line 230 is coupled in flow communication with a drain 232 and includes a filter 234 and a plurality of operational valves coupled in flow communication along tap-off line 230, for example, a control valve 236 and a drain valve 238. Atomizing fluid supply circuit 226 is coupled in flow communication to at least one atomizing nozzle 227 via an atomizing fluid supply line 240. Atomizing fluid supply line 240 includes at least one operational valve, such as, for example, control valve 242. Purge fluid supply circuit 228 is also coupled in flow communication to at least one water injection nozzle 229 via a purge fluid supply line 244. Purge fluid supply line 244 includes at least one operational valve, such as, for example, control valves 246 and/or 248.

Additionally, fuel supply system 116 includes a water supply source 250 coupled in flow communication to a water manifold 252 and water injection nozzle 229 via a water supply line 254. Water supply line 254 is coupled in flow communication with drain 232 and includes a plurality of operational valves coupled in flow communication along water supply line 254, such as, for example, a stop/speed ratio valve 256, control valves 258 and/or 260, and a drain valve 262. Fuel supply system 116 also includes a bypass supply line 264 coupled to, and extending between, first and second fuel supply lines 206 and 218, and tap-off line 230. Bypass supply line 264 includes at least one operational valve, such as, for example, control valves 266 and/or 268. Additionally, fuel nozzles 204 and 217, atomizing nozzle 227, and water injection nozzle 229 at least in part define a nozzle assembly 269, for example, a multiple coaxial nozzle assembly shown in FIG. 3.

In the exemplary embodiment, fuel supply system 116 is a dual-fuel system that selectively supplies one of two types of fuel flow 114 (shown in FIG. 1) to fuel nozzles 204 and 217 and combustion turbine assembly 100. In alternative embodiments, fuel supply system 116 may include any other component configuration that enables fuel supply system 116 to function as described herein. For example, first fuel supply source 200 channels a flow 270 of synthetic gas (syngas) towards fuel nozzle 204, and second fuel supply source 208 channels a flow 272 of natural gas towards fuel nozzle 217. In alternative embodiments, fuel supply system 116 may channel any other fuel flow 114 that enables combustion turbine assembly 100 to function as described herein.

In operation, fuel supply system 116 selectively channels fuel, either syngas flow 270 or natural gas flow 272, towards fuel nozzles 204 or 217 such that a fuel flow 274 is injected into a combustion chamber 300 (shown in FIG. 3), mixed with compressed air 112 (shown in FIG. 1), and ignited for combustion and forming combustion gases 118 (shown in FIG. 1). Additionally, in some embodiments, water supply source 250 selectively channels a flow 276 of water towards water injection nozzle 229 that is then mixed with fuel flow 274 to facilitate reducing nitrogen oxide (NOx) emissions. Water flow 276 is generally not injected directly into fuel flow 274, but rather, water flow 276 is atomized into water droplets by an atomization fluid flow 278 channeled through atomizing fluid supply circuit 226 to atomizing nozzle 227 prior to being mixed with fuel flow 274 at combustion chamber 300. In the exemplary embodiment, atomization fluid flow 278 uses a portion 280 of fuel flow 274, either syngas flow 270 or natural gas flow 272. In some embodiments, because water flow 276 is atomized with fuel flow 274, a separate atomizing air compressor is not needed for fuel supply system 116, thus reducing costs while improving the efficiency of combustion turbine assembly 100.

In the exemplary embodiment, fuel supply system 116 is operable in a first operational mode. During the first operational mode, fuel supply system 116 channels natural gas flow 272 to fuel nozzle 217 for combustion within combustion chamber 300. More specifically, natural gas flow 272 is channeled from second fuel supply source 214 via second fuel supply line 218, and is controlled by valves 220, 222, and 224. Additionally, water 276 is channeled to water injection nozzle 229 from water supply source 250 via water supply line 254. Water flow 276 is controlled by valves 256, 258, and 260, to facilitate reducing NOx emissions. Portion 280 of natural gas flow 272 is extracted from second fuel supply line 218 through tap-off line 230 and is channeled through filter 234 to atomizing fluid supply circuit 226 for use as atomization fluid flow 278. Atomization fluid flow 278, i.e. natural gas in this embodiment, is channeled through atomizing fluid supply line 240, and is controlled by valves 236 and 242. Flow 278 is directed into atomizing contact with water flow 276 from atomizing nozzle 227. In the exemplary embodiments, excess fluids within tap-off line 230 and water supply line 254 are channeled by gravity to drain 232 via valves 238 and 262 respectively.

In some embodiments, water flow 276 is not injected into natural gas flow 272 at combustion chamber 300. More specifically, in such embodiments, water flow 276 is not channeled to water injection nozzle 229, but rather, a purge fluid flow 282 is used to facilitate reducing a backflow of combustion gases 118 from combustion chamber 300 into a water supply conduit. In such embodiments, natural gas flow portion 280 is channeled to purge fluid supply circuit 228 for use as purge fluid flow 282. Purge fluid flow 282 is channeled through purge fluid supply line 244 to water injection nozzle 229, via valves 246 and 248, to facilitate purging water supply line 254 and to reduce a backflow of combustion gases 118.

In the exemplary embodiment, fuel supply system 116 is also operable in a second operational mode. During the second operational mode, fuel supply system 116 channels syngas flow 270 to fuel nozzle 204 for combustion within combustion chamber 300. More specifically, syngas flow 270 is channeled from first fuel supply source 200 via first fuel supply line 206, and is controlled by valves 208 and 210. Additionally, water 276 is channeled to water injection nozzle 229 from water supply source 250 via water supply line 254. Water flow 276 is controlled by valves 256, 258, and 260, to facilitate reducing NOx emissions. Portion 280 of syngas flow 270 is extracted from first fuel supply line 206 through tap-off line 230 and is channeled through filter 234 to atomizing fluid supply circuit 226 for use as atomization fluid flow 278. Atomization fluid flow 278, i.e. syngas in this embodiment, is channeled through atomizing fluid supply line 240, and is controlled by valves 236 and 242. Flow 278 is directed into atomizing contact with water flow 276 from atomizing nozzle 227. In the exemplary embodiments, excess fluids within tap-off line 230 and water supply line 218 are channeled by gravity to drain 232 via valves 238 and 262 respectively.

In some embodiments, water flow 276 is not injected into syngas flow 270 at combustion chamber 300. More specifically, in such embodiments, water flow 276 is not channeled to water injection nozzle 229, but rather, purge fluid flow 282 is used to facilitate reducing a backflow of combustion gases 118 from combustion chamber 300 into a water supply conduit. In such embodiments, syngas flow portion 280 is channeled to purge fluid supply circuit 228 for use as purge fluid flow 282. Purge fluid flow 282 is channeled to water injection nozzle 229 through purge fluid supply line 244, via valves 246 and 248, to facilitate purging water supply line 254 and to reduce a backflow of combustion gases 118.

In certain embodiments, a portion 284 of fuel flow 274, either syngas flow 270 or natural gas flow 272, is extracted upstream of stop/speed ratio valves 208 and 220 respectively. Fuel flow portion 284 is channeled through bypass supply line 264, and is controlled by valves 266 and 268, to atomizing fluid supply circuit 226 and/or purge fluid supply circuit 228. By extracting fuel flow portion 284 upstream of stop/speed ratio valves 208 and 220, pressure of fuel flow 274 at atomizing fluid supply circuit 226 is increased. By increasing the pressure of fuel flow 274 atomization of water flow 276 is increased, because fuel flow 274 pressure may be reduced after passing through operational valves, such as valves 208, 220, and/or any other valve.

Figure 3:
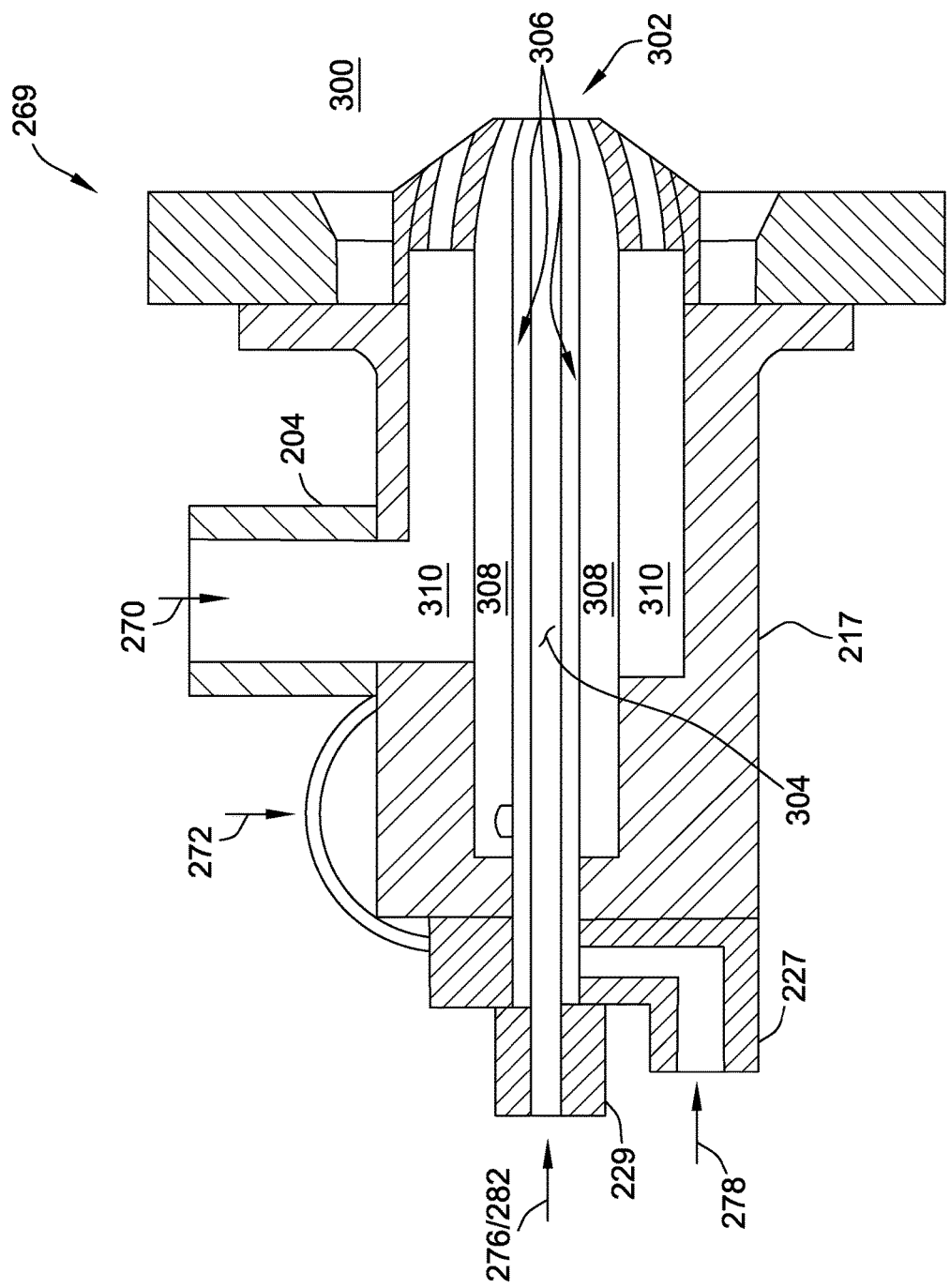
FIG. 3 is a cross-sectional view of an exemplary nozzle assembly that may be used with the fuel supply system shown in FIG. 2.

FIG. 3 is a cross-sectional view of an exemplary nozzle assembly 229 that may be used with the fuel supply system 116 (shown in FIG. 2). In the exemplary embodiment nozzle assembly 269 is positioned at least partially within combustion chamber 300. Nozzle assembly 269 includes water injection nozzle 229 having a water nozzle tip 302 from which water 279 is discharged into chamber 300. Water injection nozzle also includes a water supply conduit 304 that extends to tip 302 and that is coupled in flow communication with water supply source 250 (shown in FIG. 2). Water supply conduit 304 is also coupled in flow communication with purge fluid supply circuit 228 (shown in FIG. 2). In the exemplary embodiment, water supply conduit 304 is substantially centered within nozzle assembly 269 such that nozzle assembly 269 is a coaxial nozzle assembly.

In the exemplary embodiment, within nozzle assembly 269, an atomizing fluid supply conduit 306 of atomizing nozzle 227 at least partially surrounds water supply conduit 304. Atomizing fluid supply conduit 306 is coupled in flow communication with atomizing fluid supply circuit 226 (shown in FIG. 2). A second fuel supply conduit 308 of second fuel nozzle 217 is coupled in flow communication with second fuel supply source 214 (shown in FIG. 2) and extends at least partially about atomizing fluid supply conduit 306. Moreover, in the exemplary embodiment, a first fuel supply conduit 310 of first fuel nozzle 204 coupled in flow communication with first fuel supply source 200 (shown in FIG. 2) extends at least partially about second fuel supply conduit 308. In alternative embodiments, atomizing fluid supply conduit 306, second fuel supply conduit 308, and/or first fuel supply conduit 310 may be positioned in any other orientation within nozzle assembly 269 that enables fuel supply system 116 to function as described herein.

In operation, fuel supply system 116 selectively channels either syngas flow 270 through first fuel supply conduit 310 or natural gas flow 272 through second fuel supply conduit 308, such that fuel flow 270 or 272 is injected into combustion chamber 300. Additionally, in some embodiments, water supply source 250 channels water flow 276 through water supply conduit 304 into combustion chamber 300. In the exemplary embodiment, water flow 276 is atomized adjacent to nozzle tip 302 via contact with atomizing fluid flow 278. Flow 278 in the exemplary embodiment, may be syngas flow 270 or natural gas flow 272 flowing through atomizing fluid supply conduit 306. In alternative embodiments, water flow 276 may be atomized at any other location that enables fuel supply system 116 to function as described herein. Fuel flow 270 or 272 after mixed with water flow 276 is injected from nozzle assembly 269, mixed with compressed air 112, and ignited for combustion.

In some embodiments, water flow 276 is not injected with either syngas flow 270 or natural gas flow 272 at combustion chamber 300. In such embodiments, purge fluid flow 282 is channeled into water supply conduit 304 from purge fluid supply circuit 228 to facilitate reducing a backflow of combustion gases 118 from combustion chamber 300 into water supply conduit 304. Furthermore, in alternative embodiments, nozzle assembly 269 may include nozzles, for example fuel nozzles 204 and 217, atomizing nozzle 227, and/or water injection nozzle 229, that are positioned at different and separate locations within combustor chamber 300.

Figure 4:
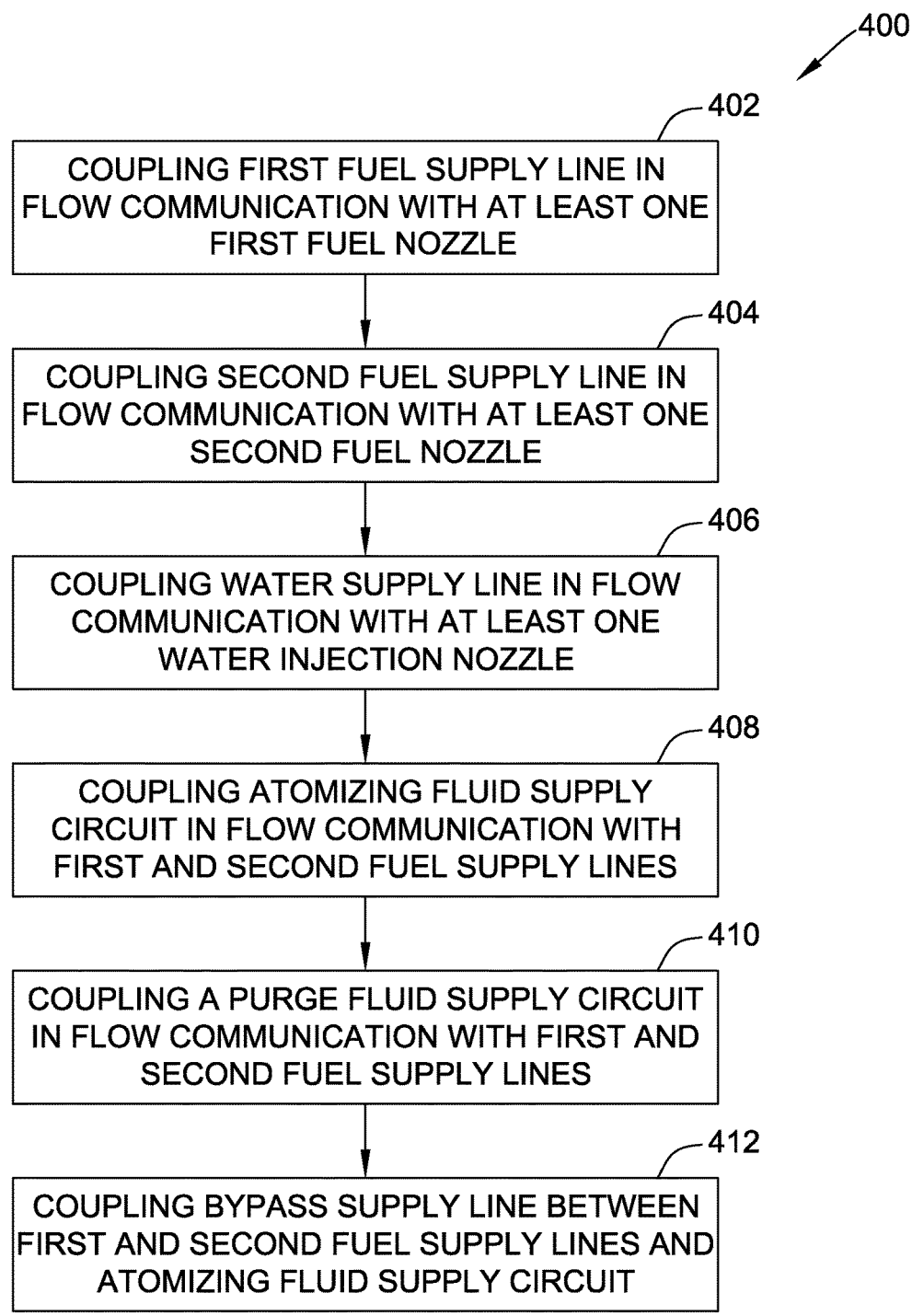
FIG. 4 is a flow diagram of an exemplary method of assembling a fuel supply system, such as the fuel supply system shown in FIGS. 2 and 3.

FIG. 4 illustrates an exemplary method 400 of assembling a fuel supply system, such as fuel supply system 116, for use in a combustion turbine assembly, such as combustion turbine assembly 100. With reference also to FIGS. 1-3, in the exemplary method 400, a first fuel supply line, such as first fuel supply line 206, is coupled 402 in flow communication with at least one first fuel nozzle, such as first fuel nozzle 204. The first fuel supply line facilitates channeling a flow of a first fuel, such as syngas flow 270, to the at least one first fuel nozzle. A second fuel supply line, such as second fuel supply line 218, is coupled 404 in flow communication with at least one second fuel nozzle, such as second fuel nozzle 217. The second fuel supply line facilitates channeling a flow of a second fuel, such as natural gas flow 272, to the at least one second fuel nozzle. A water supply line, such as water supply line 254, is also coupled 406 in flow communication with at least one water injection nozzle, such as water injection nozzle 229. The water supply line facilitates channeling a flow of water, such as water flow 276, to the at least one water injection nozzle. An atomizing fluid supply circuit, such as atomizing fluid supply circuit 226, is coupled 408 in flow communication with the first fuel supply line and the second fuel supply line to facilitate channeling a flow of an atomizing fluid, such as atomization fluid flow 278, to at least one atomizing nozzle, such as atomizing nozzle 227, and into atomizing contact with the water flow.

In the exemplary embodiment, a purge fluid supply circuit, such as purge fluid supply circuit 228, is coupled 410 in flow communication with the first fuel supply line and the second fuel supply line. The purge fluid supply circuit facilitates channeling a flow of purge fluid, such as purge fluid flow 282, to the at least one water injection nozzle and to purge the water supply line. The flow of purge fluid includes at least a portion of at least one of the first fuel flow channeled from the first fuel supply line and the second fuel flow channeled from the second fuel supply line. Additionally, a bypass supply line, such as bypass supply line 230, is coupled 412 between the atomizing fluid supply circuit and at least one of the first fuel supply line and the second fuel supply line, upstream of a stop/speed ratio valve, such as valve 208 or 220.

The above-described systems and methods provide a cost-effective method for atomizing water with a fuel flow during water injection within a combustion turbine engine. Specifically, a portion of fuel flow used for combustion within the turbine engine is diverted and used for an atomizing fluid. By using fuel flow as the atomizing fluid, a separate atomizing air compressor is not needed, thereby decreasing the associated installation and maintenance costs, as well as, decreasing the overall cost of the turbine engine. Furthermore, injecting atomized water in a combustion chamber facilitates reducing combustion emissions. Additionally, in operating scenarios in which water is not injected into the combustion chamber, the system provides that the diverted fuel flow be used as purge fluid for a water supply conduit to reduce a backflow of combustion gases. By using fuel flow as the purge fluid, a separate purge system is not needed, thereby further decreasing the associated installation and maintenance costs, as well, as decreasing the overall cost of the turbine.

An exemplary technical effect of the methods, systems, and apparatus described herein includes at least one of: (a) atomizing water injected into a combustion chamber with a portion of gas fuel flow supplied for combustion; (b) reducing combustion emissions; (c) providing a purge fluid for a water supply conduit; (d) eliminating an atomization air compressor; (e) reducing equipment costs; (f) reducing installation costs; and (g) reducing maintenance costs.

The systems and methods described herein are not limited to the specific embodiments described herein. For example, components of each system and/or steps of each method may be used and/or practiced independently and separately from other components and/or steps described herein. In addition, each component and/or step may also be used and/or practiced with other assemblies and methods.

While the disclosure has been described in terms of various specific embodiments, those skilled in the art will recognize that the disclosure can be practiced with modification within the spirit and scope of the claims. Although specific features of various embodiments of the disclosure may be shown in some drawings and not in others, this is for convenience only. Moreover, references to "one embodiment" in the above description are not intended to be interpreted as excluding the existence of additional embodiments that also incorporate the recited features. In accordance with the principles of the disclosure, any feature of a drawing may be referenced and/or claimed in combination with any feature of any other drawing.

What is claimed is:

1. A fuel supply system comprising:
a first fuel supply line coupled in flow communication between a first gaseous fuel supply source and at least one first fuel nozzle, said first fuel supply line configured to channel a flow of a first gaseous fuel from said first gaseous fuel supply source to said at least one first fuel nozzle;
a second fuel supply line coupled in flow communication between a second gaseous fuel supply source and at least one second fuel nozzle, said second fuel supply line configured to channel a flow of a second gaseous fuel from said second gaseous fuel supply source to said at least one second fuel nozzle;
a tap-off line coupled downstream from said first and second gaseous fuel supply sources, and in flow communication with each of said first and second fuel supply lines via a plurality of operational valves, said plurality of operational valves configured to selectively channel to said tap-off line a portion of one of (i) the flow of the first gaseous fuel through said first supply line and (ii) the flow of the second gaseous fuel through said second supply line;
a water supply line coupled in flow communication with at least one water injection nozzle and configured to channel a flow of water to said at least one water injection nozzle;
and an atomizing fluid supply circuit coupled in flow communication with said tap-off line, said atomizing fluid supply circuit configured to selectively channel the portion of the one of the first and second gaseous fuel flows received by said tap-off line to at least one atomizing nozzle and into atomizing contact with the water flow, wherein said at least one first fuel nozzle, said at least one second fuel nozzle, said at least one water injection nozzle, and said at least one atomizing nozzle are arranged together in a coaxial nozzle assembly.

2. The fuel supply system in accordance with claim 1 further comprising a purge fluid supply circuit coupled in downstream flow communication with said tap-off line, said purge fluid supply circuit configured to selectively channel the portion of the one of the first and second gaseous fuel flows received by said tap-off line to said at least one water injection nozzle and to purge said water supply line.

3. The fuel supply system in accordance with claim 1, wherein said atomizing fluid supply circuit is further configured to atomize the water flow at a tip of said at least one water injection nozzle.

4. The fuel supply system in accordance with claim 1 further comprising a bypass supply line coupled between said first fuel supply line and said tap-off line upstream from said atomizing fluid supply circuit, wherein said bypass supply line is upstream from a stop/speed ratio valve coupled in flow communication with said first fuel supply line, said bypass supply line configured to selectively channel the first gaseous fuel flow to said atomizing fluid supply circuit.

5. The fuel supply system in accordance with claim 1 further comprising a bypass supply line coupled between said second fuel supply line and said tap-off line upstream from said atomizing fluid supply circuit, wherein said bypass supply line is upstream from a stop/speed ratio valve coupled in flow communication with said second fuel supply line, said bypass supply line configured to selectively channel the second gaseous fuel flow to said atomizing fluid supply circuit.

6. The fuel supply system in accordance with claim 1, wherein said first gaseous fuel supply source is configured to supply a flow of synthetic gas.

7. The fuel supply system in accordance with claim 1, wherein said second gaseous fuel supply source is configured to supply a flow of natural gas.

8. A turbine assembly comprising:
a combustor;
and a fuel supply system configured to supply a flow of fuel to said combustor, said fuel supply system comprising:
a first fuel supply line coupled in flow communication between a first gaseous fuel supply source and at least one first fuel nozzle and configured to channel a flow of a first gaseous fuel from said first gaseous fuel supply source to said at least one first fuel nozzle;
a second fuel supply line coupled in flow communication between a second gaseous fuel supply source and at least one second fuel nozzle and configured to channel a flow of a second gaseous fuel from said second gaseous fuel supply source to said at least one second fuel nozzle;
a tap-off line coupled downstream from said first and second gaseous fuel supply sources, and in flow communication with each of said first and second fuel supply lines via a plurality of operational valves, said plurality of operational valves configured to selectively channel to said tap-off line a portion of one of (i) the flow of the first gaseous fuel through said first supply line and (ii) the flow of the second gaseous fuel through said second supply line;
a water supply line coupled in flow communication with at least one water injection nozzle and configured to channel a flow of water to said at least one water injection nozzle;
and an atomizing fluid supply circuit coupled in flow communication with said tap-off line, said atomizing fluid supply circuit configured to selectively channel the portion of the one of the first and second gaseous fuel flows received by said tap-off line to at least one atomizing nozzle and into atomizing contact with the water flow,
wherein said at least one first fuel nozzle, said at least one second fuel nozzle, said at least one water injection nozzle, and said at least one atomizing nozzle are arranged together in a coaxial nozzle assembly.

9. The turbine assembly in accordance with claim 8 further comprising a purge fluid supply circuit coupled in downstream flow communication with said tap-off line, said purge fluid supply circuit configured to selectively channel the portion of the one of the first and second gaseous fuel flows received by said tap-off line to said at least one water injection nozzle and to purge said water supply line.

10. The turbine assembly in accordance with claim 8, wherein said atomizing fluid supply circuit is further configured to atomize the water flow at a tip of said at least one water injection nozzle.

11. The turbine assembly in accordance with claim 8 further comprising a bypass supply line coupled between said first fuel supply line and said tap-off line upstream from said atomizing fluid supply circuit, wherein said bypass supply line is upstream from a stop/speed ratio valve coupled in flow communication with said first fuel supply line, said bypass supply line configured to selectively channel the first gaseous fuel flow to said atomizing fluid supply circuit.

12. The turbine assembly in accordance with claim 8 further comprising a bypass supply line coupled between said second fuel supply line and said tap-off line upstream from said atomizing fluid supply circuit, wherein said bypass supply line is upstream from a stop/speed ratio valve coupled in flow communication with said second fuel supply line, said bypass supply line configured to channel the second gaseous fuel flow to said atomizing fluid supply circuit.

13. The turbine assembly in accordance with claim 8, wherein said first gaseous fuel supply source is configured to supply a flow of synthetic gas.

14. The turbine assembly in accordance with claim 8, wherein said second gaseous fuel supply source is configured to supply a flow of natural gas.

15. A method of assembling a fuel supply system for use in a turbine assembly, said method comprising:
coupling a first fuel supply line in flow communication between a first gaseous fuel supply source and at least one first fuel nozzle, the first fuel supply line configured to channel a flow of a first gaseous fuel from the first gaseous fuel supply source to the at least one first fuel nozzle;
coupling a second fuel supply line in flow communication between a second gaseous fuel supply source and at least one second fuel nozzle, the second fuel supply line configured to channel a flow of a second gaseous fuel from the second gaseous fuel supply source to the at least one second fuel nozzle;

coupling a tap-off line downstream from said first and second gaseous fuel supply sources, and in flow communication with each of the first and second fuel supply lines via a plurality of operational valves, the plurality of operational valves configured to selectively channel to the tap-off line a portion of one of (i) the flow of the first gaseous fuel through the first supply line and (ii) the flow of the second gaseous fuel through the second supply line;

coupling a water supply line in flow communication with at least one water injection nozzle, the water supply line configured to channel a flow of water to the at least one water injection nozzle;

coupling an atomizing fluid supply circuit in flow communication with the tap-off line, the atomizing fluid supply circuit configured to selectively channel the portion of the one of the first and second gaseous fuel flows received by the tap-off line to at least one atomizing nozzle and into atomizing contact with the water flow; and arranging said at least one first fuel nozzle, said at least one second fuel nozzle, said at least one water injection nozzle, and said at least one atomizing nozzle together in a coaxial nozzle assembly.

16. The method in accordance with claim 15 further comprising coupling a purge fluid supply circuit in flow communication with the tap-off line, the purge fluid supply circuit configured to selectively channel the portion of the one of the first and second gaseous fuel flows received by the tap-off line to the at least one water injection nozzle and to purge the water supply line.

17. The method in accordance with claim 15 further comprising coupling a bypass supply line between the tap-off line and the first fuel supply line, wherein the bypass supply line is upstream of a stop/speed ratio valve coupled in flow communication with the first fuel supply line, the bypass supply line configured to selectively channel the first gaseous fuel flow to the atomizing fluid supply circuit.

* * * * *